United States Patent

Vorndran et al.

[11] Patent Number: 6,135,916
[45] Date of Patent: Oct. 24, 2000

[54] PROCESS FOR CONTROLLING THE PRESSURE OF A CVT DURING A STANDING START

[75] Inventors: Ralf Vorndran, Bodolz; Rolf Karrer, Eriskirch, both of Germany

[73] Assignee: ZF Friedrichshafeb AG, Friedrichshafen, Germany

[21] Appl. No.: 09/125,347

[22] PCT Filed: Mar. 21, 1997

[86] PCT No.: PCT/EP97/01433

§ 371 Date: Aug. 17, 1998

§ 102(e) Date: Aug. 17, 1998

[87] PCT Pub. No.: WO97/37159

PCT Pub. Date: Oct. 9, 1997

[30] Foreign Application Priority Data

Mar. 30, 1996 [DE] Germany .......................... 196 12 870

[51] Int. Cl.[7] .................................................. F16H 61/06
[52] U.S. Cl. ..................... 477/48; 477/117; 477/45
[58] Field of Search .................... 477/116, 117, 477/45, 48, 156, 158

[56] References Cited

U.S. PATENT DOCUMENTS

| | | | |
|---|---|---|---|
| 4,955,260 | 9/1990 | Oshidari | 74/868 |
| 5,063,815 | 11/1991 | Oshidari | 74/867 |
| 5,157,992 | 10/1992 | Hayashit et al. | 477/48 X |
| 5,188,007 | 2/1993 | Hattori et al. | 477/48 X |
| 5,207,617 | 5/1993 | Kato et al. | 477/48 X |
| 5,649,876 | 7/1997 | Morishita | 474/28 |

FOREIGN PATENT DOCUMENTS

| | | |
|---|---|---|
| 41 04 542 A1 | 8/1991 | Germany . |
| 195 06 148 A1 | 9/1995 | Germany . |

OTHER PUBLICATIONS

Japanese Abstract, Aisin AW CO Ltd, No. 2,3772 (A), vol. 14, No. 135, published on Mar. 14, 1989 (Jan. 9, 1990).

Antriebstechnik 32, "Kräfte und Wirkungsgrad beim Schubgliederband Teil II: Im Band auftretende Kräfte", 1993, pp. 57–60.

Japanese Abstract, Fuji Heavy Ind Ltd., No. 07–174218, vol. 95, No. 10, publsihed Nov. 30, 1995 (Jul. 11, 1995).

Japanese Abstract, Fuji Heavy Ind Ltd., No. 05–263906, vol. 18, No. 34, published Jan. 19, 1994 (Oct. 12, 1993).

Automobiltechnische Zeitschrift 96, "Stufenloses Automatikgetriebe Ecotronic von ZF", 1994, pp. 378–384.

*Primary Examiner*—Khoi Q. Ta
*Attorney, Agent, or Firm*—Davis and Bujold

[57] ABSTRACT

A pressure controlling system for a CVT of the belt with bevelled pulley type is proposed in which, on detection of a shift from the neutral or park position, the pressure in the primary and secondary pulleys is raised to a first level. This ensures that the variator (1) can transmit the full torque on initiation of a drive operation.

9 Claims, 1 Drawing Sheet

PROCESS FOR CONTROLLING THE PRESSURE OF A CVT DURING A STANDING START

BACKGROUND OF THE INVENTION

The invention relates to a process for controlling the pressure on the belt of a CVT with of the bevelled pulley type in which, after setting of the belt, the transmission ratio and the transmission torque is determined by the pressure of the primary and secondary pulleys on the belt.

Continuously variable automatic transmissions of the belt with bevelled pulley type, hereinafter called CVT (continuously variable transmission), comprise the following units: starting unit, forward/reverse drive unit, variator, intermediate shaft, differential, hydraulic and electronic control device. Such a design is known from ATZ Automobiltechnische Zeitschrift 96 (1994), page 380. The variator, in turn, comprises a first bevelled pulley, with a hydraulic adjusting unit, situated on the input side, a second bevelled pulley situated on the output side, also having a hydraulic adjusting unit, and a belt extending between the bevelled pulleys. Each bevelled pulley, in turn, comprises an axially stationary, bevelled pulley half and an axially movable, bevelled pulley half. The bevelled pulley situated on the input side is hereinafter designated as the primary pulley. The bevelled pulley situated on the output side is hereinafter designated the secondary pulley. The axial position of the axially movable, primary pulley half determines the contact radius of the belt and thus the ratio of the CVT. The axial position of the axially movable, secondary pulley half determines the contact pressure of secondary pulley on the belt and thus the torque transmission capacity. The primary and secondary pulleys are adjusted by the pressure level in the respective hydraulic adjusting unit. These pressures are determined by the electronic control device by means of an electromagnetic pressure regulator located in the hydraulic control device. In this connection, a process for determining the contact pressure of the secondary pulley on the belt has been disclosed in Antriebstechnik 32 (1993), No. 9, pages 57 to 60. In the process, a problem that arises is that the torque-transmission capacity of the variator, when torque is first applied for, is not ensured, for example, when the engine is off or the transmission is in neutral or park. The reason for this is the back of pressure in the primary pulley, because in the starting ratio, the primary pulley is on the mechanical stop, that is, the adjusting space is pressureless and the belt runs on its minimal moving radius. As consequence of this, slippage can occur which, in turn, can result in damage to the belt and to the bevelled pulleys.

Another problem arises during reverse shifts. Reverse shifts are changes from a forward driving operation to a reverse driving operation and vice versa. Due to the reversal in direction of rotation, the course of the belt changes so that the components come to bear on each other in a reverse direction. The driver feels this occurrence as an impact which impairs the comfort when switching.

SUMMARY OF THE INVENTION

The problem to be solved by the invention thus is to ensure a reliable torque transmission with initiation of a driving position.

According to the invention, the problem is solved by the fact that on detection of the shift from a neutral or park position to a forward or reverse driving operation, an elevated first pressure level p1 is delivered to the primary and secondary pulleys via a selector lever. The pressure level of the primary pulley is determined in a manner such that the transmission ratio is not changed. The advantage offered by this solution, according to the invention, is that the torque-transmission capacity of the primary pulley is immediately determined. Contrary to what has been described in the prior art, there is no need to wait for a specific turning angle of the primary pulley.

In a development of this, it is proposed that on initiation of a driving operation, a time period be started during which the pressure level in the primary and secondary pulleys is reduced from the first pressure level p1, via a characteristic line, to a second pressure level p2. The second pressure level is calculated according to an algorithm as is known from the cited prior art.

In another development, it is proposed that on initiation of a driving operation the pressure level of the primary and secondary pulleys be adjusted to a third pressure level when an accelerator pedal position exceeds a limit value. This third pressure level is here higher than the first pressure level.

As second solution of the problem, according to the invention, it is proposed that with the movement of the selector lever from a forward to a reverse driving operation or vice versa, the actuation of the forward or reverse master clutch be delayed by a time period T2. During the time period T2, the pressure level in the primary and also in the secondary pulley is reduced to zero so that the bevelled pulley/belt system completely relaxes.

As third solution of the problem, according to the invention, it is proposed that when moving the selector lever (10) from a forward to a reverse driving operation or vice versa, the pressure level is not reduced to zero in the disengaging switching component, but a residual pressure (pR) is adjusted to provide a drag torque on the disengaging switching component. The residual pressure (pR) is selected here so that the pressure masses on the primary side are damped as the slack of the variator passes through.

DESCRIPTION OF THE PREFERRED EMBODIMENTS

Figure 1:
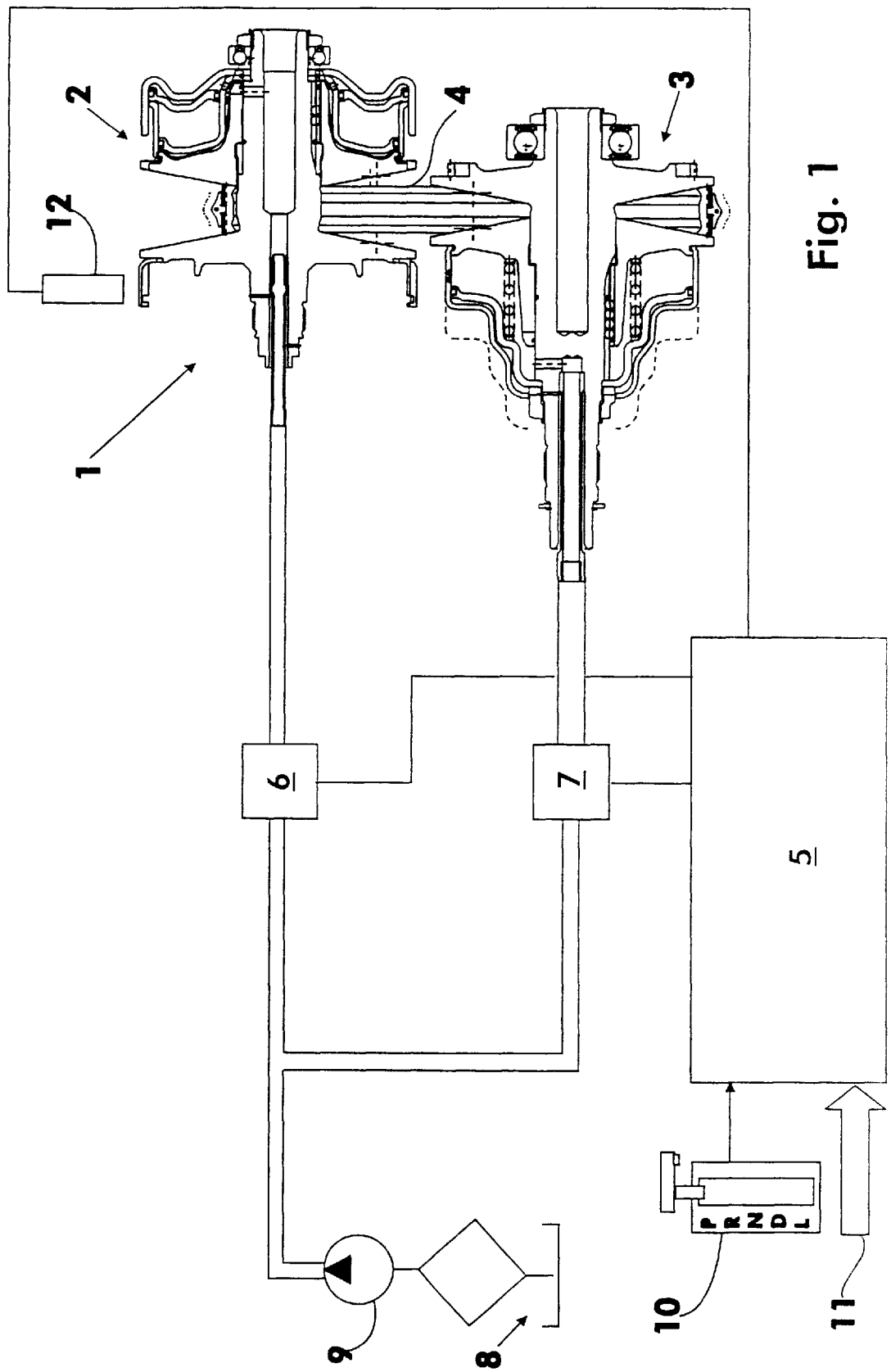
In FIG. 1 is shown an embodiment of the invention. A simplified system diagram of a CVT is shown. The complete design is described in the ATZ Automobiltechnische Zeitschrift 96 (1994) 6, page 380.

The reference numeral 1 shows a variator consisting of a primary pulley 2, a secondary pulley 3 and a belt 4. The pressure level in the primary pulley is determined by an electromagnetic pressure regulator 6. The pressure level in the secondary pulley is determined by an electromagnetic pressure regulator 7. Both pressure regulators 6 and 7 are controlled by an electronic transmission control 5. The electronic transmission control 5 calculates from input variables 11, the function parameters of the CVT. Input variables 11 are, for example, a signal from a throttle valve, a signal representing the speed of the input unit, the temperature of the hydraulic medium and the pressure level of the secondary pulley or the system pressure. Also added are input variables representing the speed of the primary pulley 12 and position selector lever 10. By means of the position selector lever 10 a driver presets, as known per se, the driving operation and driving direction.

The process is as follows.

After initiation of a forward or reverse driving operation from the position N or P, an elevated first pressure level p1 is delivered to the primary and secondary pulleys. This pressure level p1 is independent of the algorithm known from the prior art. The pressure preset for the primary pulley is selected so that no change of ratio occurs from the actual starting. The ratio thus remains unchanged. Starting from the first pressure level p1, the pressure level in the primary and secondary pulleys is reduced to a second pressure level p2, according to a transition function. The pressure level p2, in turn, corresponds to the pressure level calculated from the algorithm. If the case now arises that a high transmission input torque is required, for example, when the driver actuates the accelerator pedal, a third pressure level p3 is immediately provided. This pressure level p3 is above the pressure level p1. The transition from the pressure level p3 to the pressure level p2, calculated by means of the algorithm, likewise takes place according to a transition function. A condition for this is the detection of a driving operation, a speed threshold being exceeded and a direction of rotation. By using the speed threshold combined with the direction of rotation, a power flow reversal is promptly detected within the variator, for example, when the vehicle rolls backward. For reversal shifts, the course of the process is as follows. On detection of a reversal, for example, D-N-R, the control of the corresponding switching component of the forward-reverse driving unit is delayed. Within the time of delay, the variator is completely freed by reducing the pressure level to zero in the primary and secondary pulleys. Hereby is obtained a compensation of the forces in the traction and thrust strand force. In other words, during this phase of transition, the components always arrange themselves in the same initial state. After expiration of the delay time T2, a pressure level is adjusted in the primary and secondary pulleys according to the algorithm.

It is alternatively proposed, when changing from the position D to R, to reduce the pressure in the forward master clutch only to a residual pressure pR in order to build up an artificial drag torque. Said drag torque damps the rotary masses as the slack of the variator passes through, that is, reversal of the course of the spiral from D to R. In the same way, when reversing from R to D, the reverse brake is loaded with a residual pressure pR'. As soon as the switching element to be engaged can reliably transmit the torque, the residual pressure pR or pR' is reduced to zero in the disengaging switching component. When reversing, a crossover shift to drag torque level is almost effected.

| Reference numerals | |
| --- | --- |
| 1 variator | 7 electromagnetic pressure regulator |
| 2 primary pulley | |
| 3 secondary pulley | 8 lubricant sump |
| 4 belt | 9 pump |
| 5 electronic transmission control | 10 selector lever |
| | 11 input variables |
| 6 electromagnetic pressure regulator | 12 speed of primary pulley |

What is claimed is:

1. A process for controlling a drive force of a belt of a beveled pulley continuously variable transmission, the continuously variable transmission having a primary pulley and a secondary pulley which each have an axially stationary pulley and an axially movable pulley, the first and second pulleys being coupled to one another via a belt to provide drive therebetween, the first and second pulleys each being coupled to a respective electromagnetic pressure regulator (6 or 7) for controlling an operating pressure of the primary and secondary pulleys, an control device (5) being coupled to both of the electromagnetic pressure regulators (6 and 7) to control operation of the electromagnetic pressure regulator (6 or 7) on ae basis of input variables, and an operating pressure of the primary and secondary pulleys being determined by an algorithm calculating a ratio of the primary pulley to the secondary pulley; the process comprising the steps of:

upon detection of a shift of the continuously variable transmission, via actuation of a selector lever (10), from one of a neutral and a park position to one of a forward and a reverse driving position, delivering an increased operating pressure at a first pressure level (p1), via operation of the control device, to the primary and secondary pulleys;

maintaining a belt gripping pressure of the primary pulley such that a drive ratio of the continuously variable transmission remains constant upon initiation of one of the forward driving operation and the reverse driving operation; and starting a first time period (T1) during which the pressure level (p1) is decreased to a second pressure level (p2) in which the second pressure level (p1) corresponds to a pressure calculated by the algorithm.

2. The process according to claim 1, further comprising the step of, upon exceeding a transmission input speed threshold and detection of the forward driving position, starting the first time period (T1) during which the belt gripping pressure of the primary and the secondary pulleys is reduced, along a characteristic line, from the first pressure level (p1) to a second lower pressure level (p2), and the second pressure level (p2) corresponds to a pressure level calculated by the algorithm.

3. The process according to claim 1, further comprising the step of, upon detecting one of the forward and the reverse driving position and detecting an elevated transmission input torque, adjusting the belt gripping pressure of the primary and the secondary pulleys to a third pressure level (p3) which is higher than the first pressure level (p1).

4. The process according to claim 1, further comprising the step of, upon changing the selector lever (10) between the forward driving position to the reverse driving position, delaying actuation of a reverse master clutch by a second time period (T2), and reducing a pressure level in the primary and the secondary pulleys to a pressure of zero during the second time period (T2) to relax the belt.

5. The process according to claim 1, further comprising the step of, upon changing the selector lever (10) between the reverse driving position to the forward driving position, delaying actuation of a forward master clutch by a second time period (T2), and reducing a pressure level in the primary and the secondary pulleys to a pressure of zero during the second time period (T2) to relax the belt.

6. The process according to claim 4, further comprising the step of, after elapse of the second time period (T2), the adjusting the belt gripping pressure of the primary and the secondary pulleys to a pressure determined by the algorithm.

7. The process according to claim 5, further comprising the step of, after elapse of the second time period (T2), adjusting the belt gripping pressure of the primary and the secondary pulleys to a pressure determined by the algorithm.

8. The process according to claim 1, further comprising the step of when changing the selector lever (10) from a forward driving position to a reverse driving position, reducing a pressure level of a disengaging switching component to a residual belt gripping pressure (pR), which is a pressure level above zero, so as to generated a drag torque on the disengaging switching component, and selecting the residual pressure (pR) so that rotary masses are damped as slack passes through the continuously variable transmission.

9. The process according to claim 1, further comprising the step of when changing the selector lever (10) from a reverse driving position to a forward driving position, reducing a pressure level of a disengaging switching component to a residual belt gripping pressure (pR), which is a pressure level above zero, so as to generated a drag torque on the disengaging switching component, and selecting the residual pressure (pR) so that rotary masses are damped as slack passes through the continuously variable transmission.

* * * * *